Feb. 16, 1960 R. H. THORNER 2,925,066
BELLOWS MECHANISM
Filed Sept. 26, 1957
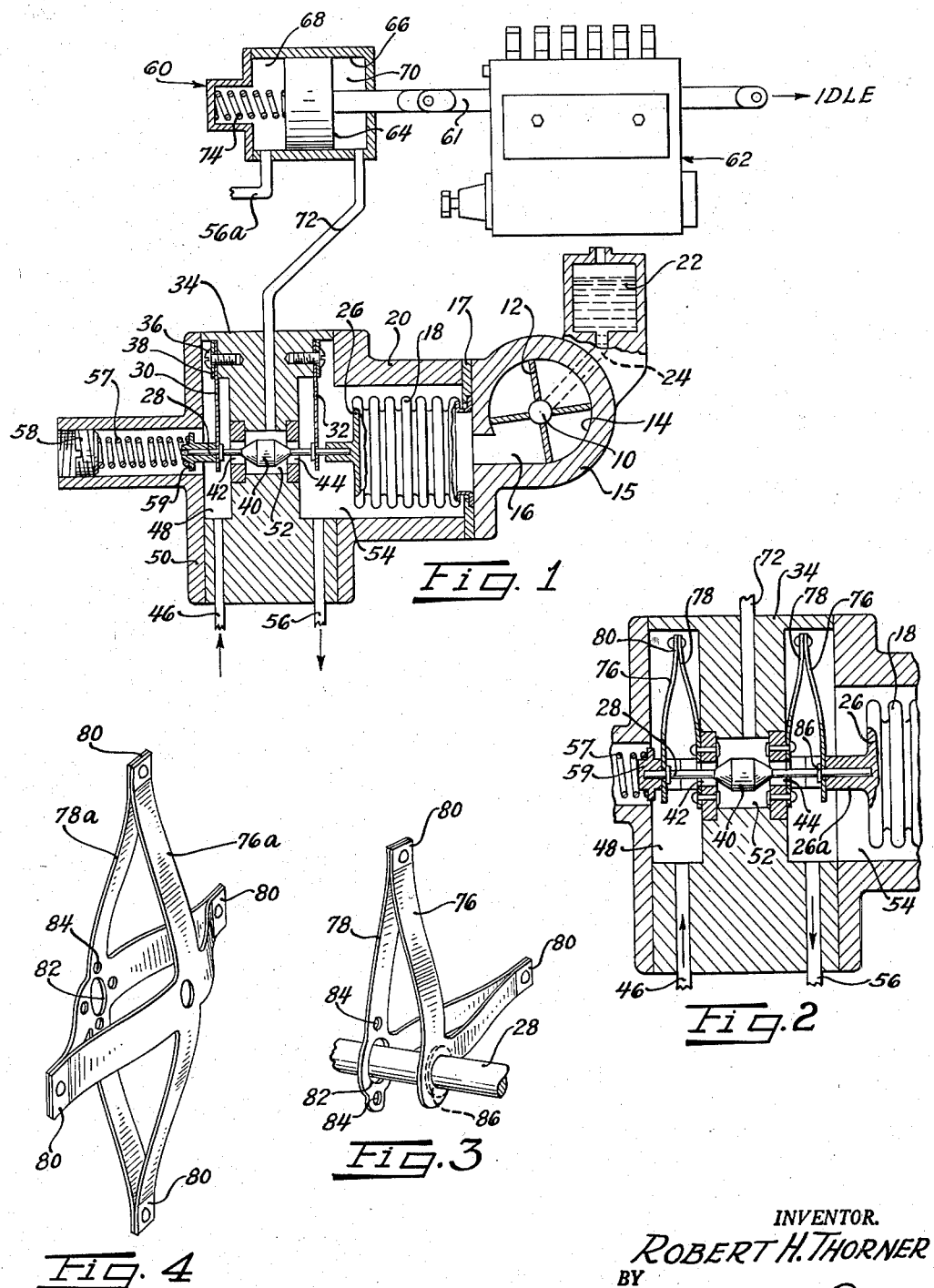
INVENTOR.
ROBERT H. THORNER
BY
Owen & Owen
ATTORNEYS United States Patent Office 2,925,066
Patented Feb. 16, 1960

2,925,066

BELLOWS MECHANISM

Robert H. Thorner, Detroit, Mich.

Application September 26, 1957, Serial No. 686,522

13 Claims. (Cl. 121—43)

This invention relates to an improvement in the construction of a pressure sensitive bellows assembly, particularly of the metallic type, having utility, per se, in any kind of mechanism but having particular utility in a self operating "closed loop" type of pressure sensing control mechanism, such as in a speed governor. This application is a continuation-in-part of my copending patent applications, Serial No. 291,381, filed June 3, 1952 for "Fluid-Operated Speed Governor," and Serial No. 216,822, filed March 21, 1951, for a "Governor Device," now Patent No. 2,808,042, issued October 1, 1957.

When any bellows unit particularly of the metallic type is used in any mechanism as a means for sensing changes in pressure, the free end of the bellows can move away from its axis if it is not guided or supported by suitable means, and this problem is particularly severe in long travel bellows wherein the free end is capable of extreme deviations from its axis. By way of contrast, this problem does not exist in a rubber diaphragm type of pressure sensitive member since it has no axial length. In present installations of pressure sensitive metallic bellows, particularly of the long travel type, the free end is usually guided by a sliding shaft, or the like. However, one of the desirable features of a metallic bellows, in many control mechanisms for example, is its inherent frictionless character, and the use of a sliding shaft to guide the free end of the bellows adds sufficient friction to destroy, or at least detract from, this highly desirable characteristic.

A primary object of the present invention is to provide in a bellows construction, particularly but not essentially of the metallic type, frictionless supporting means comprising leaf spring members arranged to provide completely frictionless movements of the bellows and its actuated means in response to pressure changes, such construction being most useful in any kind of mechanism requiring frictionless pressure response, and particularly in closed-loop automatic control mechanisms, as in speed governors.

Another object of the present invention is to provide in a frictionless bellows construction recited in the foregoing paragraph a novel form of leaf-spring supporting means to provide completely axial movements of the bellows in all operating positions.

Further objects and advantages of the invention will be apparent from the following description, taken in connection with the appended drawings, in which—

Fig. 1 is a diagrammatic illustration of one type of frictionless bellows suspension in the environment of a speed governor;

Figs. 2, 3 and 4 are directed to a modification of Fig. 1 wherein the frictionless supporting leaf springs provide completely axial movement of the bellows.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not limitation.

In the drawings, the bellows construction is illustrated in the environment of a speed governor for an engine such as a diesel engine, and is the type of governor disclosed in my above-mentioned copending patent application, Serial No. 291,381. Since the complete governor action is thoroughly described in that application, the construction and operation need only be briefly described herein.

Referring now to the drawings, and particularly to Fig. 1, the governor includes a shaft 10 driven by the engine (not shown) proportional to the speed thereof for rotating a vane element 12 in a cylindrical housing 14 of a body 15 which forms a chamber 16. A bellows element 18, such as the metallic type, is sealably secured to the body 15 by a plate 17 held in place by a housing 20, so that from a hydraulic standpoint, the chamber 16 includes the space inside the bellows element 18. Liquid is supplied to chamber 16 from a reservoir 22 through a conduit 24. Rotation of the vane element 12 causes the liquid in chamber 16 in the path of the vane element to revolve, so that the centrifugal force of the revolving liquid produces a pressure in the interior of the bellows element to produce a leftward force (as viewed in Fig. 1) on an end wall member 26, which pressure and force vary as a function of the speed of the engine.

A shaft member 28 is supported by a pair of parallel thin leaf spring members 30 and 32 for frictionless axial movements of the shaft member. One end of each leaf spring member is secured to a housing 34 by suitable fastening means as by screws 36 having rectangular anti-torque members 38 between the head of the screws and the housing so that only thrust is transmitted to the leaf springs. The free ends of the leaf springs are secured to the shaft means by suitable means, as by soldering, clamping, spinning, etc. The right end of the shaft member projects into a close fitting bore in the end wall member 26. In this construction, the leaf springs serve to support the shaft member 28 and the free end of the bellows 18 at the end wall member 26 for frictionless axial movements in response to changes in pressure in chamber 16, but the rigidity provided by the width of the leaf springs prevents movements transverse to the axial direction.. Hence, the cooperative pressure-responsive movements of the bellows and the shaft member are completely free of all sliding-surface contact between solid surfaces and have contact only with the adjacent fluids, such as the liquid in chamber 16 and air or liquid as in chambers 48, 52, and 54, in Fig. 1.

In the illustrated form shown in Fig. 1, the shaft member includes a valve body 40 having a pair of opposite conical faces for cooperating with a fluid inlet orifice 42 and an outlet orifice 44 to form a pair of oppositely and gradually varying restrictions as the valve body 40 is moved. Any fluid, such as a liquid or gas, having sufficient pressure to operate a servo-motor (to be described) is supplied to conduit 46 whence it flows into a chamber 48 formed by a cover 50, and the fluid passes through orifice 42 into a valve body chamber 52, and out orifice 44 to a drain chamber 54 under substantially atmospheric or constant pressure, and out to drain through a conduit 56. Due to the modulating characteristics of the valve body in relation to the orifices 42 and 44, the pressure in chamber 52 gradually and smoothly varies from the pressure in chamber 48 to the pressure in the drain chamber 54 as the valve body gradually is moved from its extreme right to its extreme leftward positions, as viewed in Fig. 1. A spring 57 acts on the shaft and its valve body member to oppose the forces of the bellows member due to the pressures produced in chamber 16. An adjusting screw 58 is provided to vary the opposing force of spring 57. The free end of the spring is supported by a retainer 59 which is carried by the shaft member 28. The details of this leaf spring construction as applied to a pilot valve is disclosed in my Patent No. 2,737,165 for a "Governor Device" issued March 6, 1956.

A servo-motor 60 is provided to actuate the fuel control element of the engine, such for instance as the rack 61 of a conventional fuel pump 62 of a diesel engine. The servo-motor 60 includes a pressure responsive member, such as a piston 64 sliding in a cylinder 66 to form with the cylinder end walls two fluid chambers 68 and 70. Chamber 68 is subjected to drain pressures through a conduit 56a, and chamber 70 is subjected to the pressure in chamber 52 through a conduit 72. A spring 74 urges the rack 61 toward the idle position and opposes the force on piston 64 due to the pressure in chamber 70.

In operation of the foregoing construction, as the engine speed increases, the valve body assumes a position leftwardly, as shown, when the adjusted force of spring 57 balances the force of the bellows 18. The pressure produced in chamber 52 by the valve body 40 as above-described is transmitted to chamber 70 to produce a corresponding position of the piston 64 in balance with spring 74. However, due to the large area of the piston 64 and the relatively high pressure of the fluid available in supply conduit 46, the forces produced by the piston are very large in relation to the initial signal forces produced by the bellows, so that any friction in the fuel control means and its linkages is negligible percentage-wise. If the load changes to increase engine speed, the valve body 40 (commonly known as a pilot valve in servo-mechanisms) moves leftwardly, as shown, to reduce the pressure in chamber 70, and the piston then moves the rack rightwardly to restore the governed speed when spring 74 again is in balance with the force of piston 64. If the load changes to reduce the engine speed the governor mechanism acts in a reverse manner to restore the set speed. Any desired governed speed may be selected by adjusting the screw 58.

It can be seen that all combined movements of the bellows, the shaft member 28 and its valve body 40, and the free end of the spring 57 are completely frictionless in responding to minute changes of pressure in chamber 16 produced by small changes in speed. Hence the governor is extremely sensitive and produces excellent and consistent performance. Furthermore, the free end of the bellows is constrained for substantially axial movements by the leaf spring supports while maintaining the highly desirable frictionless nature of a bellows in the entire mechanism that must respond to the initiating signal, which in the example shown, is pressure varying as a function of engine speed. This frictionless construction of a bellows with its free end supported by a shaft suspended by a pair of leaf springs may be applied in any device or mechanism wherein such frictionless construction is desirable. The pressure signal operating the bellows may be produced as function of any sensing signal from velocity of a fluid, temperature of a gas, etc., or any other pressure of any condition to be sensed. Also, the shaft member can carry any desired actuating element. For example, the valve body member 40 could be moved to the left end of the shaft member 28 (if the spring 57 is omitted or moved elsewhere) to perform any kind of valving action. Or, if desired in electric devices, the valve body and its orifices could be omitted, and the shaft member 28 could operate any kind of switching means such as electric contact points, or the shaft could operate the core of a solenoid, etc. But regardless of what kind of elements are actuated by the bellows member, the principal construction for the primary inventive concept of the instant case is the assembly of a bellows with its free end supported by a shaft suspended by leaf spring means to provide completely frictionless forces to the actuated elements while maintaining substantially axial alignment of the free end of the bellows. Such construction has particular utility in a speed-governor combination as shown in Fig. 1.

In the form of the invention shown in Fig. 1, the shaft member 28 and the end of the bellows will rise and fall slightly due to the slightly arcuate path of the leaf springs. Since the pilot valve body 40 travels only a small distance in a governor, such as .040" for example, the effects on the free end of the bellows are negligible. However, in many devices, particularly where the shaft travel is relatively long, it may be desirable or even necessary to support the free end of the bellows member without any deviation from axial travel. Figs. 2, 3 and 4 are modifications of Fig. 1 showing a unique leaf spring suspension to maintain complete axial alignment.

Referring to Figs. 2 and 3, the governor parts are generally the same as in Fig. 1 and are so numbered. However, the leaf springs 30 and 32 of Fig. 1 have been replaced by a modified leaf spring construction which eliminates the effect of the arcuate path of the free ends of the leaf springs described above. In this construction two V-shaped leaf springs 76 and 78 have their corresponding leg-ends secured together by suitable means, as by rivets, as shown at 80. An opening 82 is provided in the central portion of V-spring 78 for free passage of the shaft member 28, and this central portion is secured by suitable means, as by rivets, to the pieces forming the orifices 42 and 44 through the holes 84. The central portion of the other V-leaf spring member 76 is soldered or otherwise secured between flanges 86 of the shaft member and the adjacent retainer, such as retainer 59 and the extension 26a of end wall 26. With such a construction, each leg provides rigidity in its plane in a direction transverse to the rigidity provided by the other leg of that leaf spring. Thus movement of the shaft member forces each of the two sets of supporting leaf springs to bend in such manner as to cause the joined leg-ends 80 to move toward the shaft member when the leaf springs of each pair spread apart and away from the shaft member when the leaf springs of each pair move toward each other. The inherent rigidity due to the arrangement of the leaf springs prevents non-axial movements of the shaft member.

Fig. 4 shows a construction similar to the supporting leaf springs of Figs. 2 and 3, except that the leaf springs of Fig. 4 are cross-shaped. In Fig. 4, the leaf springs 76a and 78a in effect comprise two V-springs 76 and 78, respectively, which are joined together at four points at 80 in Fig. 4 instead of two points as in Figs. 2 and 3. The installation and operation of the form of the leaf spring suspension shown in Fig. 4 is otherwise the same as for the V-springs of Figs. 2 and 3. Although the form of leaf spring support shown in Fig. 4 requires more space than the form shown in Fig. 3, the form in Fig. 4 provides more rigidity in preventing non-axial movements.

By virtue of the above constructions the objects of the invention listed above, and numerous additional advantages are attained.

What I claim is:

1. In a mechanism having a fluid chamber, a bellows element forming a movable wall of said chamber and responsive to fluid pressure operating said mechanism, and frictionless swingable means having width imparting rigidity in a direction substantially transverse to the axis of the bellows element acting to support a movable end of said bellows element and constrain said movable end for frictionless movements thereof in a substantially axial direction and to prevent surface contact of said supported bellows element other than fluid contact during operational movements thereof.

2. In a mechanism having a fluid chamber, a bellows element forming a movable wall of said chamber and responsive to fluid pressure operating said mechanism, and leaf spring means having width imparting rigidity in a direction substantially transverse to the axis of the bellows element acting to support a movable end of said bellows element and constrain said movable end for frictionless movements thereof in a substantially axial direction and to prevent surface contact of said supported bellows element other than fluid contact during operational movements thereof.

3. In a mechanism to operate movable means in accordance with changes in an operating fluid pressure comprising, bellows means responsive to said pressure changes to produce forces varying as a function of said operating pressure, shaft means connected to a movable free end of said bellows means and substantially in the same direction to the axis thereof for actuation thereby and adapted to actuate said shaft means, a pair of spaced substantially parallel leaf spring members each having one end thereof secured to a fixed portion of said mechanism, said leaf spring members having width imparting rigidity in a direction substantially transverse to the axis of said shaft means acting to support the connected shaft means and said free end of said bellows means at the free ends of said leaf spring members and to constrain said bellows means and said shaft means for frictionless movements thereof in a substantially axial direction and to prevent surface contact of said supported bellows means and said shaft means other than fluid contact during operational movements thereof.

4. The combination of means defined in claim 1, and shaft means operated by said bellows element, and said mechanism including a fluid passage for the flow of fluid therethrough, and said shaft means including valve means for controlling the flow of fluid in said passage.

5. The combination of elements defined in claim 3, and said mechanism including a fluid passage for the flow of fluid therethrough, a valve means including a valve body member and a mating member, said shaft means including one of said valve members also supported by said leaf spring members for frictionless movements free of surface contact other than fluid contact to control the flow of fluid in said passage.

6. In a mechanism to operate movable means in accordance with changes in an operating fluid pressure comprising, bellows means responsive to said pressure changes to produce forces varying as a function of said operating pressure, said movable means being responsive to said forces and connected to a movable end of said bellows means, frictionless swingable means acting to support said connected movable means and said bellows end and to constrain said bellows end and said movable means for frictionless movements thereof in a substantially axial direction of said bellows means and to prevent surface contact of said supported bellows means and said movable means during operational movements thereof, said swingable supporting means comprising a pair of leaf springs, each of said spring pair having two legs substantially at right angles to each other in substantially the same plane, the central portion joining the two legs of one of said spring pair being fixed to a stationary portion of said mechanism, and the central portion joining the two legs of the other of said spring pair being fixed to the combination of said movable means and said movable end, the other corresponding two leg-ends of both of said springs being fixed together.

7. In a mechanism to operate movable means in accordance with changes in an operating fluid pressure comprising, bellows means responsive to said pressure changes to produce forces varying as a function of said operating pressure, said movable means being responsive to said forces and connected to a movable end of said bellows means, frictionless swingable means acting to support said connected movable means and said bellows end and to constrain said bellows end and said movable means for frictionless movements thereof in a substantially axial direction of said bellows means and to prevent surface contact of said supported bellows means and said movable means during operational movements thereof, said swingable supporting means comprising a pair of leaf springs, each of said spring pair including a V-shaped portion and having two legs substantially at right angles to each other in substantially the same plane, the central portion joining the two legs of one of said spring pair being fixed to a stationary portion of said mechanism, and the central portion joining the two legs of the other of said spring pair being fixed to the combination of said movable means and said movable end, the other corresponding two leg-ends of both of said springs being fixed together, and a second similarly arranged spring pair connected to said movable means at a distance from said first spring pair and substantially parallel thereto, whereby the movements of said movable means and said connected movable end are guided along substantially a straight line.

8. The combination of means defined in claim 7, and said mechanism including a fluid passage for the flow of fluid therethrough, valve means including a valve body member and a mating member, said movable means including one of said valve members also supported by said leaf springs for frictionless movements free of surface contact to control the flow of fluid in said passage.

9. In a mechanism to operate movable means in accordance with changes in an operating fluid pressure comprising, bellows means responsive to said pressure changes to produce forces varying as a function of said operating pressure, said movable means being responsive to said forces and connected to a movable end of said bellows means, frictionless swingable means acting to support said connected movable means and said bellows end and to constrain said bellows end and said movable means for frictionless movements thereof in a substantially axial direction of said bellows means and to prevent surface contact of said supported bellows means and said movable means during operational movements thereof, said swingable supporting means comprising a pair of leaf springs, each of said spring pair being cross-shaped and having four legs substantially at right angles to each adjacent leg in substantially the same plane, the central portion joining the four legs of one of said spring pair being fixed to a stationary portion of said mechanism, and the central portion joining the four legs of the other of said spring pair being fixed to the combination of said movable means and said movable end, the other corresponding four leg-ends of both of said springs being fixed together.

10. In a self-regulating control mechanism for automatically controlling a variable condition in response to changes in a pressure that varies as a function of said controlled condition, the combination of, control means to regulate said controlled condition, a pressure responsive member operatively connected to said control means for actuation thereof, a fluid circuit having a flow of fluid therethrough and communicating with said pressure responsive member, valve means in said fluid circuit for controlling pressure therein acting on said pressure responsive member for effecting movements thereof, said valve means including a valve body member and a mating member cooperable therewith, substantially frictionless swingable means imparting rigidity in one direction acting to support one of said valve members for substantially frictionless movements in a direction transverse to said first-named direction by maintaining said movable valve member suspended within the fluid controlled thereby completely free of surface contact other than fluid contact during operational movements thereof, a bellows member responsive to changes in said pressure that varies as a function of said controlled condition, a movable free end of said bellows member being connected to said supported valve member to effect movements thereof in response to changes in said last-named pressure for producing movements of said pressure responsive member and thereby amplified forces acting on said control means, said swingable means also acting to support said movable end of said bellows member to constrain said movable end for frictionless movements thereof in a substantially axial direction and to prevent surface contact of said supported bellows member other than fluid contact during operational movements thereof, substantially frictionless biasing means opposing the forces produced by said bellows member, whereby the cooperative movements of said supported valve member and said bellows member and said biasing means are frictionless and thereby respond substantially instantaneously and consistently to minute changes in said pressure varying as a function of said controlled condition acting on said bellows member to effect movement of said control means for maintaining within a predetermined variation a desired value of said controlled condition.

11. The combination of elements defined in claims 10, wherein said swingable means comprises a pair of substantially parallel leaf spring members.

12. The combination of elements defined in claim 10, and said swingable means comprising, a pair of leaf springs, each of said spring pair including a V-shaped portion and having two legs substantially at right angles to each other in substantially the same plane, the central portion joining the two legs of one of said spring pair being fixed to a stationary portion of said mechanism, the central portion joining the two legs of the other of said spring pair being fixed to the combination of said supported valve member and said movable end of said bellows member, the other corresponding two leg-ends of both of said springs being fixed together, and a second similarly arranged spring pair connected to said supported valve member at a distance from said first spring pair and substantially parallel thereto, whereby the movements of said supported valve member and said connected movable end of said bellows member are produced along substantially a straight line.

13. In a self regulating control mechanism for automatically controlling a variable condition in response to changes in pressure that varies as a function of said controlled condition, the combination comprising, means to control said controlled condition, a servo-motor operatively connected to said control means for actuation thereof, a bellows element responsive to changes in said pressure to produce forces varying as a function of said pressure, a source of energy for operating said servo-motor, means to regulate the application of desired amounts of said energy to said servo-motor, a movable free end of said bellows element connected to said regulating means to actuate same in response to changes in said forces for producing movements of said servo-motor and thereby amplified forces acting on said control means to effect controlled-condition-regulating movements thereof, frictionless swingable means having width imparting rigidity in a direction substantially transverse to the axis of said bellows element acting to support said movable free end thereof and the bellows-connected portion of said regulating means and to constrain same for frictionless movements thereof in a substantially axial direction and to prevent surface contact of said supported bellows element and said bellows-connected portion during operational movements thereof.

References Cited in the file of this patent
UNITED STATES PATENTS

| | | |
|---|---|---|
| 220,202 | Wilder | Sept. 30, 1879 |
| 1,887,322 | Nettleton | Nov. 8, 1932 |
| 2,011,931 | Dreyer | Aug. 20, 1935 |
| 2,426,740 | Mock | Sept. 2, 1947 |
| 2,736,304 | Thorner | Feb. 28, 1956 |
| 2,737,165 | Thorner | Mar. 6, 1956 |
| 2,772,010 | Schink | May 14, 1957 |